(12) United States Patent
Nickles

(10) Patent No.: US 6,410,919 B1
(45) Date of Patent: Jun. 25, 2002

(54) POSITRON GUN FOR PET ATTENUATION MEASUREMENTS

(75) Inventor: Robert J. Nickles, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/443,980

(22) Filed: Nov. 19, 1999

(51) Int. Cl.$^7$ ................................................ G01T 1/164
(52) U.S. Cl. ........................ 250/363.03; 250/363.01; 250/252.1
(58) Field of Search .................. 250/363.01, 252.1, 250/363.03

(56) References Cited

U.S. PATENT DOCUMENTS

| | | | | |
|---|---|---|---|---|
| 5,224,037 A | | 6/1993 | Jones et al. ............ 364/413.19 |
| 5,272,344 A | * | 12/1993 | Williams ................ 250/363.03 |
| 5,530,245 A | * | 6/1996 | Huang ........................ 250/307 |
| 5,750,991 A | | 5/1998 | Moyers et al. ......... 250/363.03 |
| 5,798,527 A | * | 8/1998 | Muehllehner et al. . 250/363.03 |
| 6,264,597 B1 | * | 7/2001 | Lacy ............................. 600/3 |

* cited by examiner

Primary Examiner—Georgia Epps
Assistant Examiner—M. Hasan
(74) Attorney, Agent, or Firm—Quarles & Brady LLP

(57) ABSTRACT

A positron gun is mounted to a PET scanner to illuminate a patient with positrons during a calibration emission scan. A calibration sinogram is produced and used to reconstruct an image which locates boundaries between structures of different attenuation values. An attenuation image is produced and forward projected to provide an attenuation sinogram used to correct emission images acquired by the PET scanner.

11 Claims, 4 Drawing Sheets

POSITRON GUN FOR PET ATTENUATION MEASUREMENTS

STATEMENT REGARDING FEDERALLY SPONSORED RESEARCH

This application was made with government support under Grant No. NS31612 awarded by the National Institute of Health. The United States government has certain rights in this invention.

BACKGROUND OF THE INVENTION

The field of the invention is positron emission tomography (PET) scanners, and particularly the calibration of such scanners.

Positrons are positively charged electrons which are emitted by radionuclides that have been prepared using a cyclotron or other device. The radionuclides most often employed in diagnostic imaging are fluorine-18 ($^{18}F$), carbon-11 ($^{11}C$), nitrogen-13 ($^{13}N$), and oxygen-15 ($^{15}O$). These are employed as radioactive tracers called "radiopharmaceuticals" by incorporating them into substances, such as glucose or carbon dioxide. The radiopharmaceuticals are injected in the patient and become involved in such processes as glucose metabolism, fatty acid metabolism and protein synthesis.

As the radionuclides decay, they emit positrons. The positrons travel a very short distance before they encounter an electron, and when this occurs, they are annihilated and converted into two photons, or gamma rays. This annihilation event is characterized by two features which are pertinent to PET scanners—each gamma ray has an energy of 511 keV and the two gamma rays are directed in substantially opposite directions. An image is created by determining the number of such annihilation events at each location within the field of view.

Positron emission tomography provides quantitative images depicting the concentration of the positron emitting substance throughout the patient. The accuracy of this quantitative measurement depends in part on the accuracy of an attenuation correction which accounts for the absorption of some of the gamma rays as they pass through the patient. The attenuation correction factors modify the sinogram which contains the number of annihilation events at each location within the field of view. There are a number of methods used to measure, or calculate the attenuation factors. These include calculating the attenuation correction; measuring attenuation correction; and a hybrid, or segmented tissue technique.

Calculated attenuation correction is employed if the object being imaged has a well defined outline, is homogeneous in electron density and has a known attenuation coefficient (e.g., water attenuating 511 keV photons with a linear attenuation coefficient of $\mu=0.095$ cm$^{-1}$). In that event, the outline of the body section (e.g., the scalp in a brain scan) is drawn. Then the lines of response (LOR's) that would have been measured with a pencil beam of 511 keV photons are computed by forward projection through the outline. This LOR-set forms a sinogram of attenuation correction factors suitable for correcting the image data sinogram acquired from the emission scan. The advantage of the calculated attenuation correction is that it is noiseless. The disadvantage is that it introduces errors in cases where the assumptions of homogeneity are violated, or when the chosen outline does not coincide with the actual section. Brain scanning, with a regular shape and only a few millimeters of calverium thickness ($\mu\approx0.117$ cm$^{-1}$), is generally regarded as suitable for calculated attenuation, while the thorax, with its extensive interior lung volumes, is usually not considered suitable.

Measured attenuation correction is performed by placing a source of gamma rays on the LOR, outside of the patient and measuring attenuation through the patient along this line. One measurement is made without the patient and a second measurement is made with the patient in place. By calculating the ratio of the two measurements, variations in this ratio represent the desired measured attenuation data. As described, for example, in U.S. Pat. No. 5,750,991, many different mechanisms are used to place the gamma ray source on each LOR and acquire the attenuation correction data in what is referred to as a "transmission scan".

The major disadvantage of this measured attenuation correction technique is that unless the transmission scan has excellent statistical precision, additional noise is propagated into the corrected emission. With realistic Ge-68 source strengths and detector limitations, this translates to transmission scanning times of the order of tens of minutes, prior to administering the radiotracer for the emission scan. Furthermore, since the biodistribution of many agents (e.g., $^{18}FDG$) require times of the order of an hour to achieve the desired blood clearance, the patient must spend this intervening period motionless in the scanner in order to avoid misregistration artifacts. Finally, the technologist is obliged to take transmission scans of all axial fields that could be conceivably needed, demanding considerable prescience about the outcome of the emission scans, and increasing the discomfort of the patient on the scanner bed. The acquisition of the transmission image after the emission scan results in contamination of the transmission measurement from the activity in the field of view.

The hybrid approach, often referred to as the segmented tissue technique, combines the advantages of noiseless calculated attenuation, applied to more complex volumes such as the thorax, with lung. A short measured attenuation scan is taken, with poor statistics, but with enough contrast to delineate the major outlines of the chest wall and lung periphery. Back projection of this attenuation data forms a noisy $\mu$-image, with a histogram of $\mu$-values peaked at 0 (air), $\approx0.095$ cm$^{-1}$ (unity density soft tissue) and $\approx0.03-0.04$ cm$^{-1}$ (lung). By thresholding, the chest wall and lung outlines on the image are formed and the interiors are filled with the accepted $\mu$-values of 0.095 and 0.0.02-0.04 cm$^{-1}$. Forward projection through this "forced-contrast" image creates a noise free sinogram needed for attenuation correction of the subsequent emission scans. This is a valuable first-order improvement on the measured attenuation approach, but still needs enough precision to delineate irregular internal outlines, and suffers from deviations from homogeneity often seen in lung density.

SUMMARY OF THE INVENTION

The present invention is a method for producing an attenuation correction sinogram for a PET scanner and a positron gun for practicing this method. More particularly, a positron gun is mounted to the PET scanner to illuminate a patient in the scanner with positrons, a calibration sinogram is acquired from the resulting annihilation events and back projected to form a calibration image that depicts the boundaries between structures in the patient having different attenuation values. Attenuation values are assigned to these different structures and the resulting attenuation image is forward projected to form an attenuation sinogram used to correct acquired emission images of the patient.

The positron gun includes a source of positrons such as Na-22 contained in a housing which directs a beam of positrons out an opening in one end. The size of this beam may be adjusted and the positron gun is mounted on the PET scanner and transported around the patient to illuminate all surfaces.

A general object of the invention is to accurately correct an emission image acquired on a PET scanner. The calibration sinogram acquired using the positron gun is obtained very quickly after the images to be corrected have been acquired. This calibration data very precisely locates the boundaries of different structures and enables a more accurate and noise free attenuation correction sinogram to be computed.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
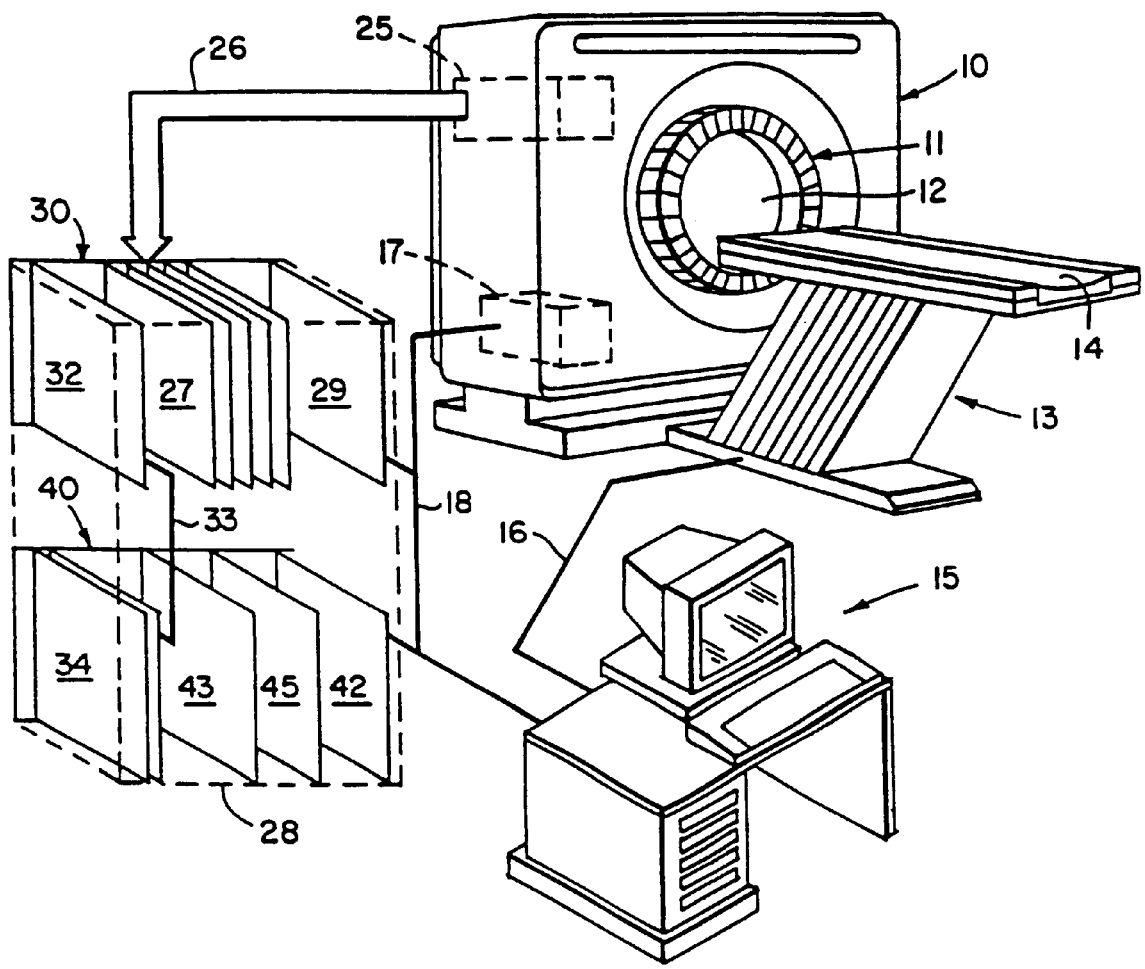
FIG. 1 is a pictorial representation of a PET scanner system which employs the present invention.

Referring particularly to FIG. 1, the PET scanner system includes a gantry 10 which supports a detector ring assembly 11 about a central opening, or bore 12. A patient table 13 is positioned in front of the gantry 10 and is aligned with the central axis of the bore 12. A patient table controller (not shown) moves the table bed 14 into the bore 12 in response to commands received from an operator work station 15 through a serial communications link 16. A gantry controller 17 is mounted within the gantry 10 and is responsive to commands received from the operator work station 15 through a second serial communication link 18 to operate the gantry.

Figure 2:
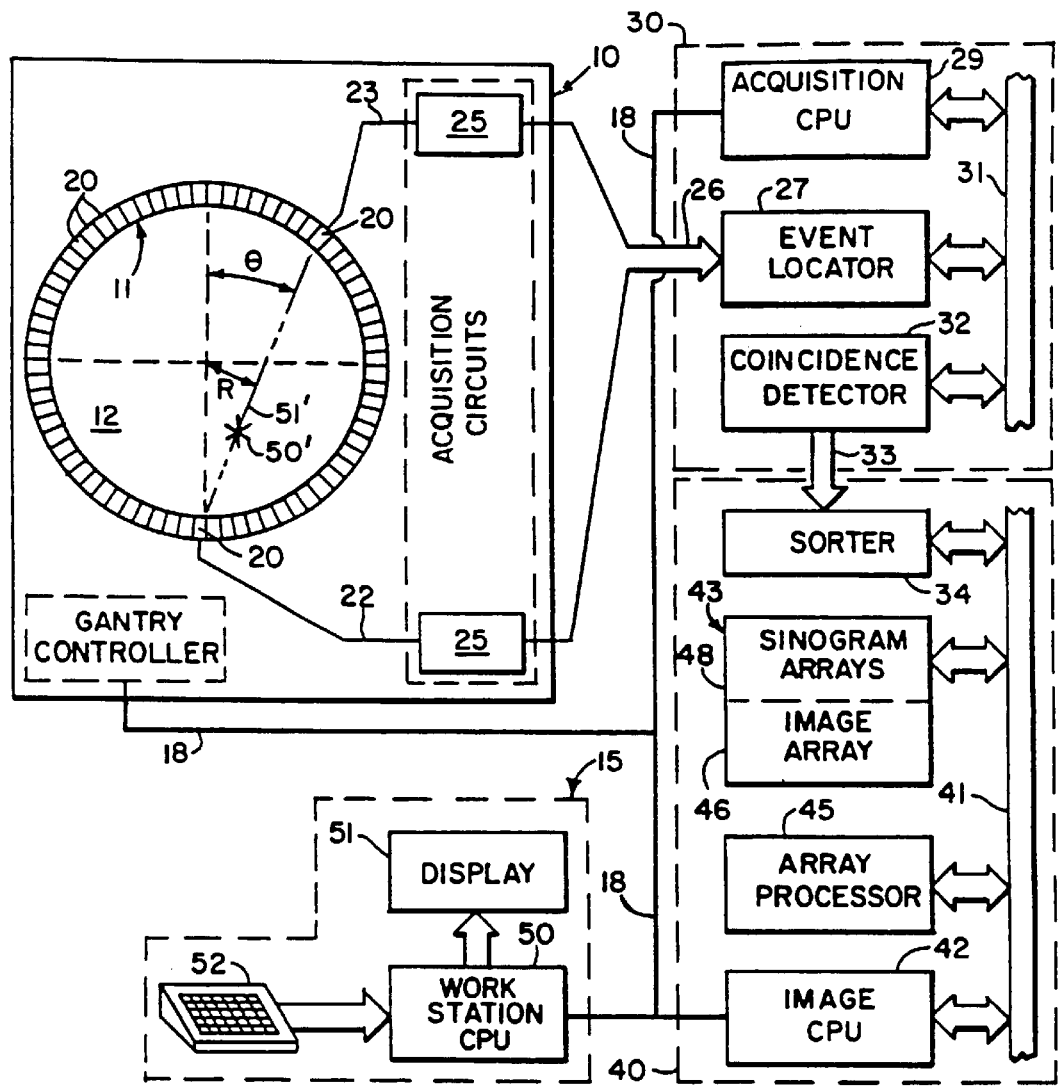
FIG. 2 is an electrical block diagram of the PET scanner system of FIG. 1.

As shown best in FIG. 2, the detector ring 11 is comprised of detector units 20. Each unit 20 includes a set of scintillator crystals (abbreviated BGO) arranged in a matrix and disposed in front of photomultiplier tubes (abbreviated PMT). Each detector unit 20 produces an analog signal on line 23 when a scintillation event occurs. A set of acquisition circuits 25 are mounted within the gantry 10 to receive these signals and produce digital signals indicating the event coordinates (x,y) and the total energy. These are sent through a cable 26 to an event locator circuit 27 housed in a separate cabinet 28. Each acquisition circuit 25 also produces an event detection pulse (EDP) which indicates the exact moment the scintillation event took place.

Referring particularly to FIGS. 1 and 2, the event locator circuits 27 form part of a data acquisition processor 30 which periodically samples the signals produced by the acquisition circuits 25. The processor 30 has an acquisition CPU 29 which controls communications on the local area network 18 and a backplane bus 31. The event locator circuits 27 assemble the information regarding each valid event into a set of digital numbers that indicate precisely when the event took place and the position of the BGO crystal 21 which detected the event. This event data packet is conveyed to a coincidence detector 32 which is also part of the data acquisition processor 30.

The coincidence detector 32 accepts the event data packets from the event locators 27 and determines if any two of them are in coincidence. Coincidence is determined by a number of factors. First, the time markers in each event data packet must be within a set time interval of each other, and second, the locations indicated by the two event data packets must lie on a straight line which passes through the field of view (FOV) in the scanner bore 12. Events which cannot be paired are discarded, but coincident event pairs are located and recorded as a coincidence data packet that is conveyed through a serial link 33 to a sorter 34.

The sorter 34 forms part of an image reconstruction processor 40. The sorter 34 counts all events occurring along each projection ray $(R,\theta)$ and organizes them into a two dimensional sinogram array 48 which is stored in a memory module 43. The image reconstruction processor 40 also includes an image CPU 42 that controls a backplane bus 41 and links it to the local area network 18. An array processor 45 also connects to the backplane 41 and it reconstructs images from the sinogram arrays 48 by a backprojection process. The resulting image array 43 is stored in memory module 43 and is output by the image CPU 42 to the operator work station 15.

The operator work station 15 includes a CPU 50, a CRT display 51 and a keyboard 52. The CPU 50 connects to the local area network 18 and it scans the keyboard 52 for input information. Through the keyboard 52 and associated control panel switches, the operator can control the calibration of the PET scanner, its configuration, and the positioning of the patient table for a scan. Similarly, the operator can control the display of the resulting image on the CRT display 51 and perform image enhancement functions using programs executed by the work station CPU 50.

Figure 3:
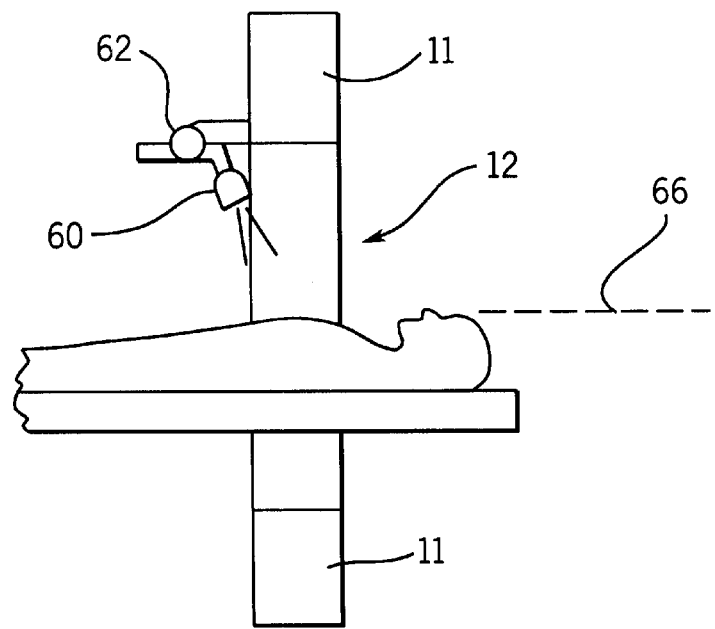
FIG. 3 is a pictorial representation of the PET scanner system of FIG. 1 showing a positron gun mounted to illuminate a patient in the PET scanner.
Figure 4:
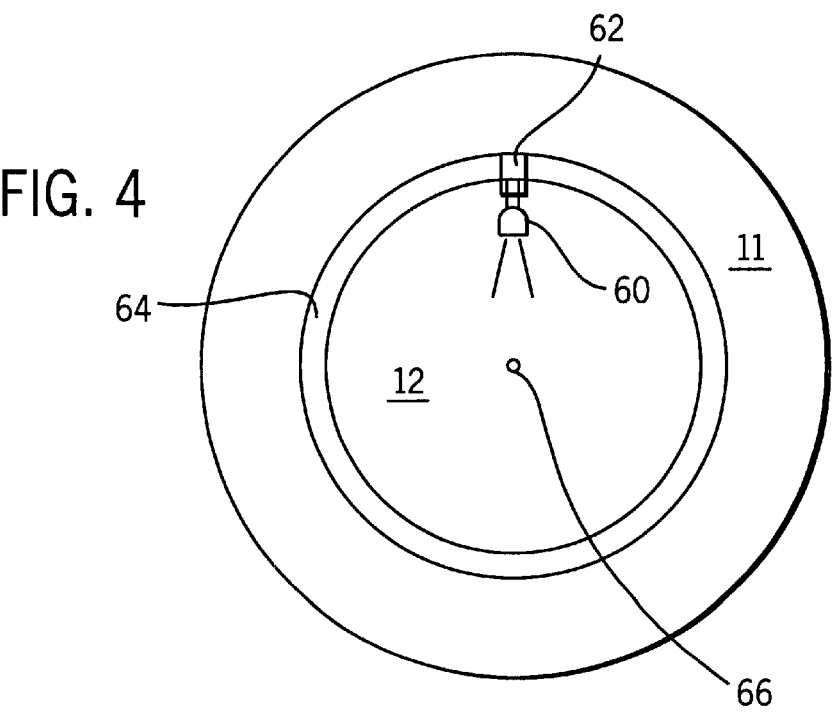
FIG. 4 is a pictorial representation of the PET scanner system of FIG. 3 showing a circular track which transports the positron gun around the patient.

To practice the present invention a source of soft positrons illuminates the surface of a patient in the bore 12 of the scanner. As will be described in more detail below, this calibration emission scan is preferably conducted after the image acquisition emission scan. As shown in FIGS. 3 and 4, the soft positrons are produced by a positron gun 60 which is mounted to a carriage 62. The carriage 62 is moved along a circular track 64 disposed around the bore 12 and concentric about a central axis 66. The axial position of the positron gun 60 is adjusted to project a diffuse beam of soft positrons on to the surface of the patient located within the detector ring assembly 11. The carriage 62 moves around the patient on the track 64 to illuminate the surface of the patient from all angles. In the preferred embodiment this emission scan is performed in seconds with a sodium-22 positron source that produces positrons having an end-point energy of 545 keV.

As the positron gun rotates around the patient, the emitted positrons strike the surface of the patient and produce annihilation events. The positrons collide with electrons at the patient's skin surface and emit gamma rays in opposite directions which travel radially outward and are detected as a coincidence event by the detector ring 11. These coincidence events are stored as a calibration sinogram in the same manner as described above to indicate the number of annihilation events at each location in the field of view.

An image is reconstructed by back projecting this calibration emission sinogram which indicates precisely the contours of the surface of the patient. This attenuation emission image is thresholded to identify boundaries, and regions defined by these boundaries are filled with suitable attenuation values. The resulting array of attenuation values are forward projected to produce a noise free attenuation sinogram which is used to correct the previously acquired image sinogram.

Figure 5:
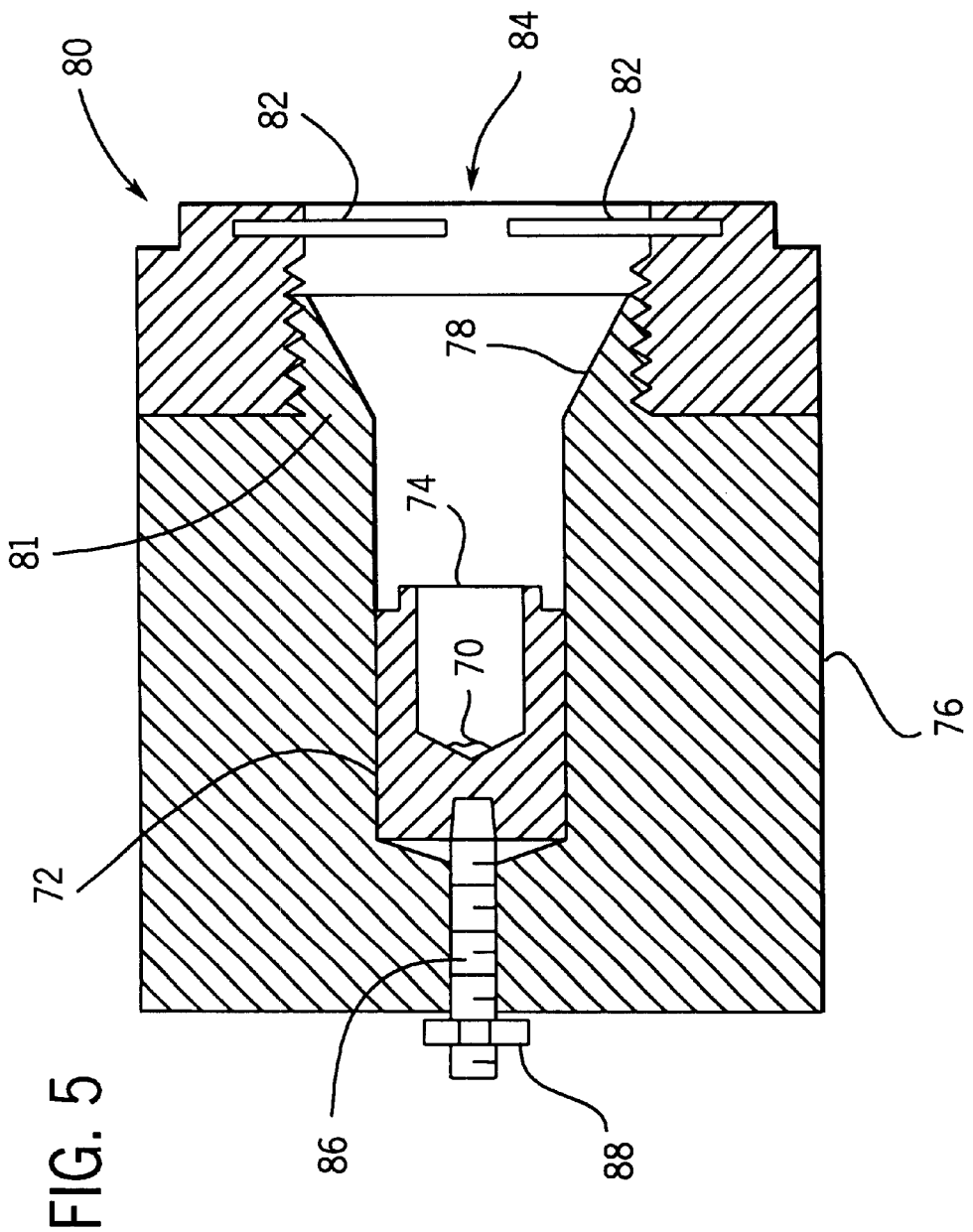
FIG. 5 is a view in cross section through the preferred embodiment of the positron gun.

Referring particularly to FIG. 5, the positron gun 60 includes a positron source 70 disposed in the bottom of a conical depression drilled into a 12 mm diameter aluminum carrier 72. The positron source 70 is approximately 2.6 mCi of no-carrier-added Na-22 in a 200 $\mu$l of HCL solution which is evaporated. The depression is covered with a 6.8 mg/cm$^2$ ($\Delta E \approx 15$ keV) aluminum foil 74 which is bonded in place. The aluminum carrier 72 minimizes bremstrahllung from the majority of positrons that are not emitted in the forward direction through the foil 74.

The aluminum carrier 72 is mounted in a 1.3 kg cylindrical brass housing 76 with the positrons produced by the source 70 exiting through a flared opening 78 formed in one of its ends. The housing 76 is of sufficient size to attenuate lateral gamma exposure by a factor of two. The forward beam of positrons is collimated with an adjustable iris 80 that is mounted to a collar 81 surrounding the flared opening 78. The iris 80 has spring steel vanes 82 of approximately 20 mg/cm$^2$ weight which effectively stop the maximal 545 keV positrons produced by the source 70. The aperture 84 defined by these vanes 82 is smoothly adjustable from 1 mm to 30 mm diameter to enable the positron beam to be adjusted from an angular aperture of 2° to 60°.

The aluminum carrier 72 is held in place by a threaded shaft 86 attached to its back end. The threaded shaft 86 extends through threaded opening in housing 76, and a nut 88 locks the shaft 86 in place when the longitudinal position of the aluminum carrier 72 is properly adjusted.

A patient is placed in the scanner and an emission scan is conducted to acquire image data stored in an image sinogram. Without moving the patient, a calibration emission scan is then performed by rotating the positron gun about the patient. The calibration sinogram is acquired and an image is reconstructed from it to precisely identify the contours of the surface of the patient and the boundaries of internal structures such as the lungs. Attenuation values are assigned to the pixels in this calibration image and this array of attenuation values is forward projected to form an attenuation sinogram. The attenuation sinogram is then employed to correct the image sinogram before its reconstruction into the final image.

What is claimed is:

1. A method for producing an image with a PET scanner, the steps comprising:

a) performing an emission scan on a patient positioned in a gantry containing a detector ring to produce an image data sinogram;

b) performing an attenuation calibration emission scan by illuminating the patient with a beam of positrons that produce annihilation events at the surface of the patient and which produce a calibration sinogram;

c) reconstructing an attenuation emission image indicating the contours of the surface of the patient from the calibration sinogram;

d) assigning attenuation values to structures depicted in the attenuation emission image to form an attenuation image;

e) producing an attenuation sinogram from the attenuation image;

f) correcting the image data sinogram with corresponding values in the attenuation sinogram; and g) reconstructing an image with the corrected image data sinogram.

2. The method as recited in claim 1 in which the attenuation calibration emission scan is performed by rotating a positron gun around the patient.

3. The method as recited in claim 1 in which the beam of positrons is produced by a positron gun containing a Na-22 positron source.

4. The method as recited in claim 1 in which steps c) and d) are performed by back projecting the sinogram data, and step e) is performed by forward projecting the attenuation image.

5. A positron gun for performing a calibration emission scan on a PET scanner, the combination comprising:

a metal housing having an opening therein which extends from one of its ends to its interior;

a carrier mounted in the opening and having a recess therein which is directed towards the one end of the housing;

a positron source material disposed in the recess; and means for adjusting the size of a beam of positrons emitted by the positron source through the one end of the housing.

6. The positron gun as recited in claim 5 in which the positron source material includes Na-22.

7. The positron gun as recited in claim 5 in which the means for adjusting includes an iris disposed around the opening in the one end of the housing and the iris includes vanes which define an aperture that may be changed in size by adjusting the iris.

8. The positron gun as recited in claim 7 in which the means for adjusting also includes means for adjusting the location of the carrier in said opening.

9. The positron gun as recited in claim 5 in which the opening is flared at the one end of the housing.

10. The positron gun as recited in claim 5 which includes means for mounting the housing to the PET scanner.

11. The positron gun as recited in claim 10 in which the means for mounting includes means for moving the housing around a bore in the PET scanner.

* * * * *